United States Patent
Ramamurthy et al.

(10) Patent No.: US 9,526,036 B1
(45) Date of Patent: Dec. 20, 2016

(54) DYNAMIC PACKET GATEWAY SELECTION BASED ON LONG TERM EVOLUTION NETWORK LOADING

(71) Applicant: Sprint Communications Company L.P., Overland Park, KS (US)

(72) Inventors: Suryanarayanan Ramamurthy, Olathe, KS (US); Jay Douglas Cole, Overland Park, KS (US); James J. Bae, Chantilly, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 242 days.

(21) Appl. No.: 14/034,094

(22) Filed: Sep. 23, 2013

(51) Int. Cl.
*H04W 36/00* (2009.01)

(52) U.S. Cl.
CPC .................. *H04W 36/0022* (2013.01)

(58) Field of Classification Search
CPC ....... H04W 28/08; H04W 88/16; H04W 80/04
See application file for complete search history.

(56) References Cited

U.S. PATENT DOCUMENTS

| | | | |
|---|---|---|---|
| 2009/0285179 A1* | 11/2009 | Jones et al. | 370/331 |
| 2011/0002297 A1* | 1/2011 | Jain et al. | 370/331 |
| 2011/0096750 A1 | 4/2011 | Velandy et al. | |
| 2012/0084449 A1 | 4/2012 | Delos Reyes et al. | |
| 2014/0003233 A1* | 1/2014 | Rune et al. | 370/230 |
| 2014/0036873 A1* | 2/2014 | Cheng et al. | 370/331 |

\* cited by examiner

*Primary Examiner* — Albert T Chou (57) ABSTRACT

Embodiments disclosed herein provide systems and methods for dynamically selecting a packet gateway based on LTE network loading. In a particular embodiment, a method provides receiving a request to establish a data session for a wireless communication device through a non-LTE wireless network. The method further provides determining an amount of non-LTE active data sessions on the non-LTE wireless network and determining an amount of LTE active data sessions on an LTE wireless network. The method further provides selecting a packet gateway for the data session based on the amount of non-LTE active data sessions and the amount of LTE active data sessions.

18 Claims, 6 Drawing Sheets

DYNAMIC PACKET GATEWAY SELECTION BASED ON LONG TERM EVOLUTION NETWORK LOADING

TECHNICAL BACKGROUND

Long Term Evolution (LTE) wireless communication networks provide access for data session communications for wireless devices. However, since an LTE network may not provide wireless signal coverage in every area, another wireless network may be used as an alternative to maintain data connectivity for devices capable of accessing both networks. For example, a wireless network operator may employ an LTE wireless network and a 3G wireless network over similar coverage areas. While communications with the LTE wireless network may be preferred by a device while located in one of the similar coverage areas, conditions may not be adequate for exchanging communications with the LTE network at all times. Thus, during the times when conditions are not adequate for LTE, the device exchanges communications for a data session with the 3G network.

Since the LTE and 3G networks discussed above may have a similar coverage area, the device may begin communicating with the LTE network during the data session established through the 3G network. To provide continuity for the data session, the 3G network establishes the data session through a packet gateway of the LTE network. Therefore, when the device switches to the LTE network during the session, the data session is not interrupted.

OVERVIEW

Embodiments disclosed herein provide systems and methods for dynamically selecting a packet gateway based on LTE network loading. In a particular embodiment, a method provides receiving a request to establish a data session for a wireless communication device through a non-LTE wireless network. The method further provides determining an amount of non-LTE active data sessions on the non-LTE wireless network and determining an amount of LTE active data sessions on an LTE wireless network. The method further provides selecting a packet gateway for the data session based on the amount of non-LTE active data sessions and the amount of LTE active data sessions.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
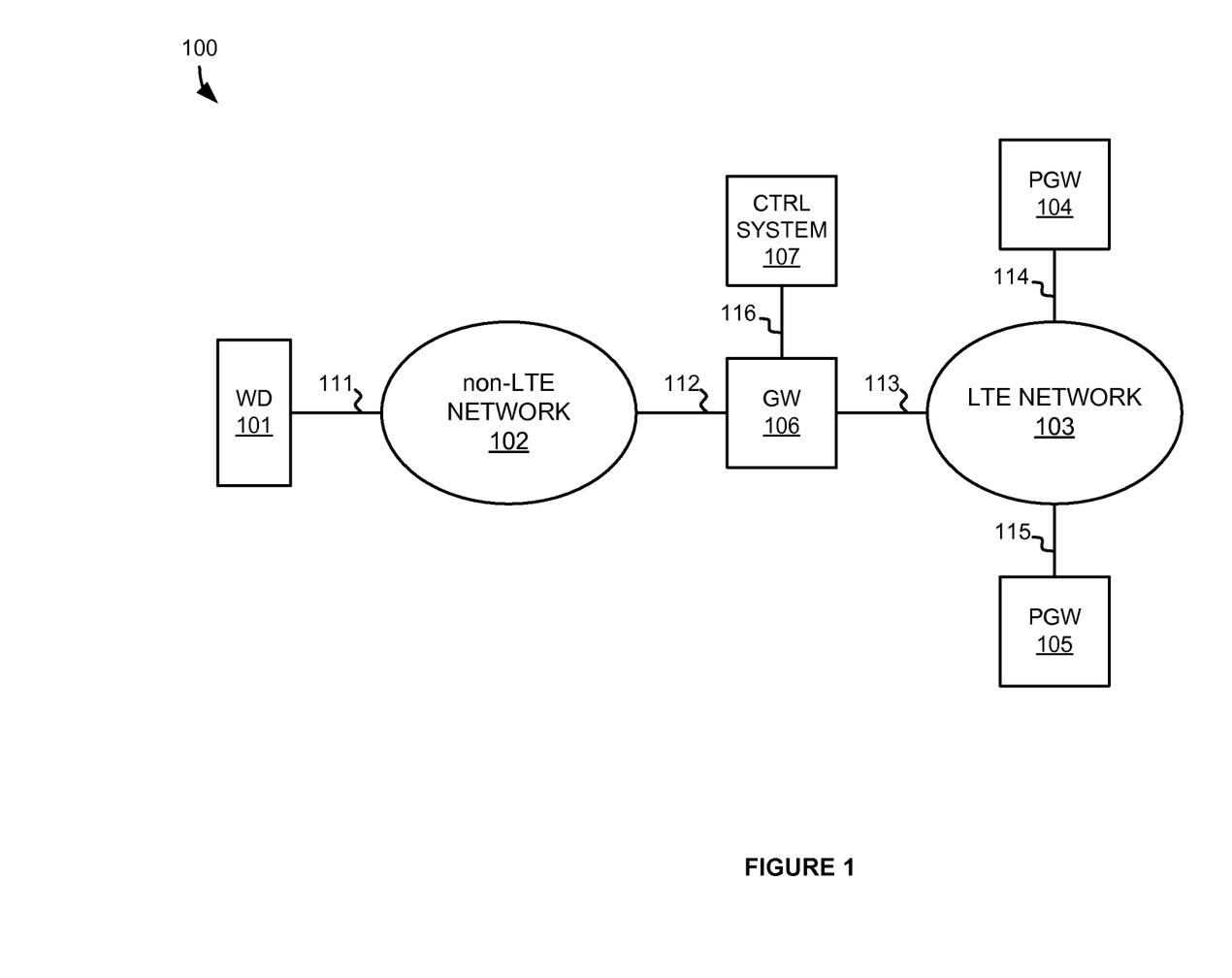
FIG. 1 illustrates a wireless communication system for dynamically selecting a packet gateway based on LTE network loading.

FIG. 1 illustrates wireless communication system 100. Wireless communication system 100 includes wireless communication device 101, non-LTE wireless communication network 102, LTE wireless communication network 103, packet gateway 104, packet gateway 105, network gateway 106, and communication control system 107. Wireless communication device 101 and non-LTE wireless communication network 102 communicate over wireless link 111. Non-LTE wireless communication network 102 and network gateway 106 communicate over communication link 112. Network gateway 106 and LTE wireless communication network 103 communicate over communication link 113. LTE wireless communication network 103 and packet gateways 104 and 105 communicate over communication links 114 and 115, respectively. Network gateway 106 and communication control system 107 communicate over communication link 116.

In operation, wireless device 101 is capable of wirelessly exchanging communications with LTE network 103 using an LTE protocol or some other LTE based protocol, such as LTE Advanced. Likewise, wireless device 101 is capable of wirelessly exchanging communications with non-LTE network 102 using a protocol that is not the LTE protocol or a derivation thereof. In addition to routing data communications for devices wirelessly communicating with LTE network 103, which includes packet gateways 104 and 105, LTE network 103 is configured to route data communications for wireless devices that are wirelessly connected through non-LTE network 102. LTE network 103 may route all data communications for devices on non-LTE network 102 or may route a subset of the data communications. For example, LTE network 103 may only route data communications for wireless devices, such as wireless device 101, that are capable of wirelessly communicating with both LTE network 103 and non-LTE network 102.

When a data communication session is initiated for a wireless device connected to non-LTE wireless network 103, a packet gateway on LTE network 103 (i.e. packet gateway 104 or 105) is selected to route traffic for the session. A packet gateway may be selected based on location of the packet gateway relative to the location where the data communication session is attached to LTE network 103. For example, a data session with wireless device 101 passes through network gateway 106. Therefore, a packet gateway closest to network gateway 106 may be selected for the data session. Selecting the closest packet gateway to network gateway 106 reduces long haul bandwidth needed to deliver communications to a farther located packet gateway and reduces latency for the data session. Alternatively, to help distribute communication load across multiple packet gateways, a packet gateway may be selected that is closest to the base station of non-LTE network 103 through which wireless device 101 is accessing non-LTE network 103 for the data session.

Figure 2:
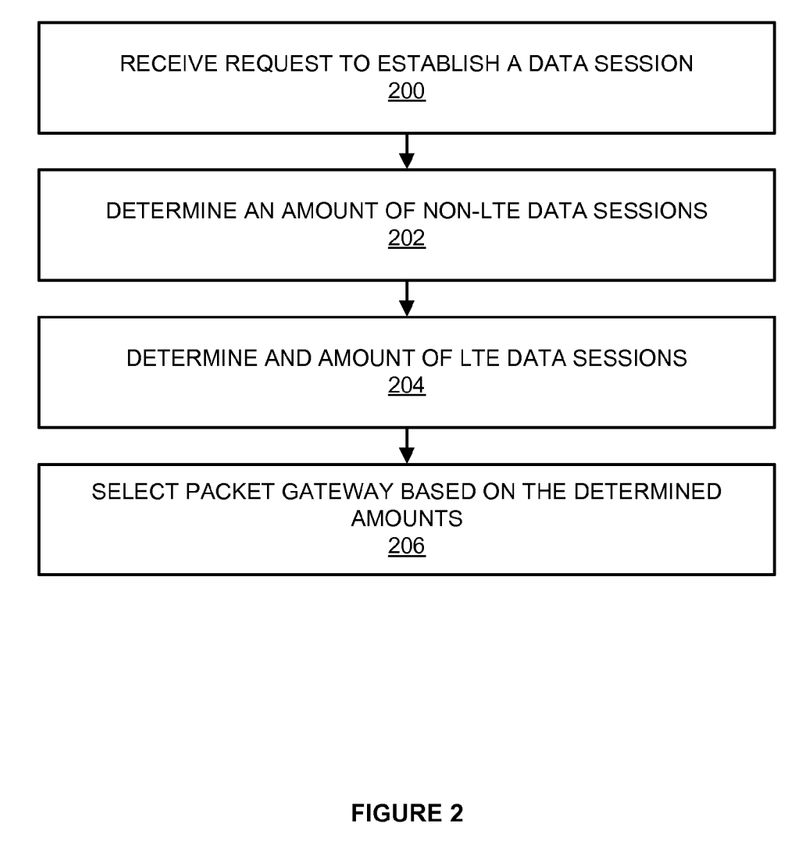
FIG. 2 illustrates an operation of the wireless communication system for dynamically selecting a packet gateway based on LTE network loading.

FIG. 2 illustrates an operation of wireless communication system 100 to dynamically select a packet gateway based on LTE network loading. Control system 107 receives a request to establish a data session for wireless device 101 through non-LTE wireless network 102 (step 200). The data session may be for an audio call, video call, audio/video media, web browsing, messaging, application information, or any other type of data communications that may be exchanged with a wireless communication device—including combinations thereof. The request may originate from wireless device 101 or from another system in wireless communication system 100, or elsewhere, intending to initiate a data session with wireless device 101.

Control system 107 determines an amount of non-LTE active data sessions on non-LTE wireless network 102 (step 202). The amount of non-LTE active data sessions are counted from data sessions for wireless devices on non-LTE network 102 that are being serviced through LTE network 103 or some subset thereof. Data sessions for devices on non-LTE network 102 that are not serviced through LTE network 103 are not included in the amount of non-LTE active data sessions. Additionally, the amount of non-LTE active data sessions may be counted from the data sessions discussed above that are active during the time the control system 107 selects a packet gateway for the data session, active at the time the request is received by control system 107, or at some other point in time that would still provide control system 107 with a relatively accurate indication of current data session loading.

The amount of non-LTE active data sessions may be determined by querying or automatically receiving information on active data sessions from one or more elements of non-LTE network 102 or network gateway 106. For example, network gateway 106 may be able to enumerate to control system 107 the amount of data sessions currently being serviced through network gateway 106. Alternatively, control system 107 may query a radio network controller within non-LTE network 102 for the amount of non-LTE data sessions.

Control system 107 also determines an amount of LTE active data sessions on LTE wireless network (step 204). The amount of LTE active data sessions may be counted as the entirety of active data sessions for wireless devices on LTE network 103 or may be counted from some subset thereof. For example, the amount of non-LTE active data sessions may be counted from data sessions currently being serviced through a particular radio network controller of non-LTE network 103. Accordingly, the amount of LTE active data sessions may be counted from data session currently being serviced by access nodes of LTE network 103 in a geographic area similar to the geographic area serviced by the radio network controller.

Once the amounts of active data sessions have been determined, control system 107 selects a packet gateway for the data session based on the amount of non-LTE active data sessions and the amount of LTE active data sessions (step 206). In general, if there are more non-LTE active data sessions, then a packet gateway closer to network gateway 106 (e.g. packet gateway 104) is selected. If there are more LTE active data sessions, then a packet gateway closer to the location of wireless device 101 (e.g. packet gateway 105) is selected. If the amount of active data sessions is somehow equal, then control system 107 may be configured to select either packet gateway. Alternatively, the equal amount case may be included in either the greater or lesser LTE active data sessions case.

Advantageously, more non-LTE active data sessions indicates that it is more likely that wireless device 101 will continue to wireless exchange communications with non-LTE network 102. Thus, the requested data session will likely continue to go through network gateway 106 and packet gateway 104 will provide less latency for the session. In contrast, more LTE active data session indicates that it is likely that wireless device 101 will begin wirelessly communicating with LTE network 103 during the data session. Therefore, once wireless device 101 switches to an access node of LTE network 103, packet gateway 105 (which is closer to wireless device 101 and, consequently, the access node through which wireless device 101 accesses LTE network 103) will provide less latency for the data session. During the time before wireless device 101 switches networks, the additional long haul bandwidth needed for the data session and the additional latency caused by packet gateway 105's distance from network gateway 106 is tolerated since wireless device 101 will likely switch to an LTE access node of LTE network 103.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, Internet access node, telephony service node, wireless data access point, or some other wireless communication system—including combinations thereof.

Non-LTE wireless network 102 comprises network elements that provide communications services to wireless device 101. Non-LTE wireless network 102 may comprise switches, wireless access nodes, base stations, base station controllers, Internet routers, network gateways, application servers, computer systems, communication links, or some other type of communication equipment—including combinations thereof.

LTE wireless network 103 comprises network elements that provide communications services to wireless device 101. While illustrated separately, packet gateways 114 and 115 may be included in LTE wireless network 103. LTE wireless network 103 may comprise additional packet gateways, switches, wireless access nodes, eNodeBs, Internet routers, network gateways, application servers, computer systems, communication links, or some other type of communication equipment—including combinations thereof.

Network gateway 106 comprises communication circuitry that bridges communications between non-LTE wireless network 102 and LTE wireless network 103. Network gateway 106 may further include a memory device, software, processing circuitry, or some other components. While network gateway 106 is shown externally to non-LTE wireless network 102 and LTE wireless network 103, network gateway 106 may be included within either or both of networks 102 and 103.

Communication control system 107 comprises a computer system and communication interface. Communication control system 107 may also include other components such as a router, server, data storage system, and power supply. Communication control system 107 may reside in a single device or may be distributed across multiple devices. Communication control system 107 is shown externally to network gateway 106, but system 107 could be integrated within the components of network gateway 106.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Wireless Fidelity (WIFI), High Speed Packet Access (HSPA), or some other wireless communication format. Communication links 112-116 uses metal, glass, air, space, or some other material as the transport media. Communication link 112-116 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112-116 could be direct links or may include intermediate networks, systems, or devices.

Figure 3:
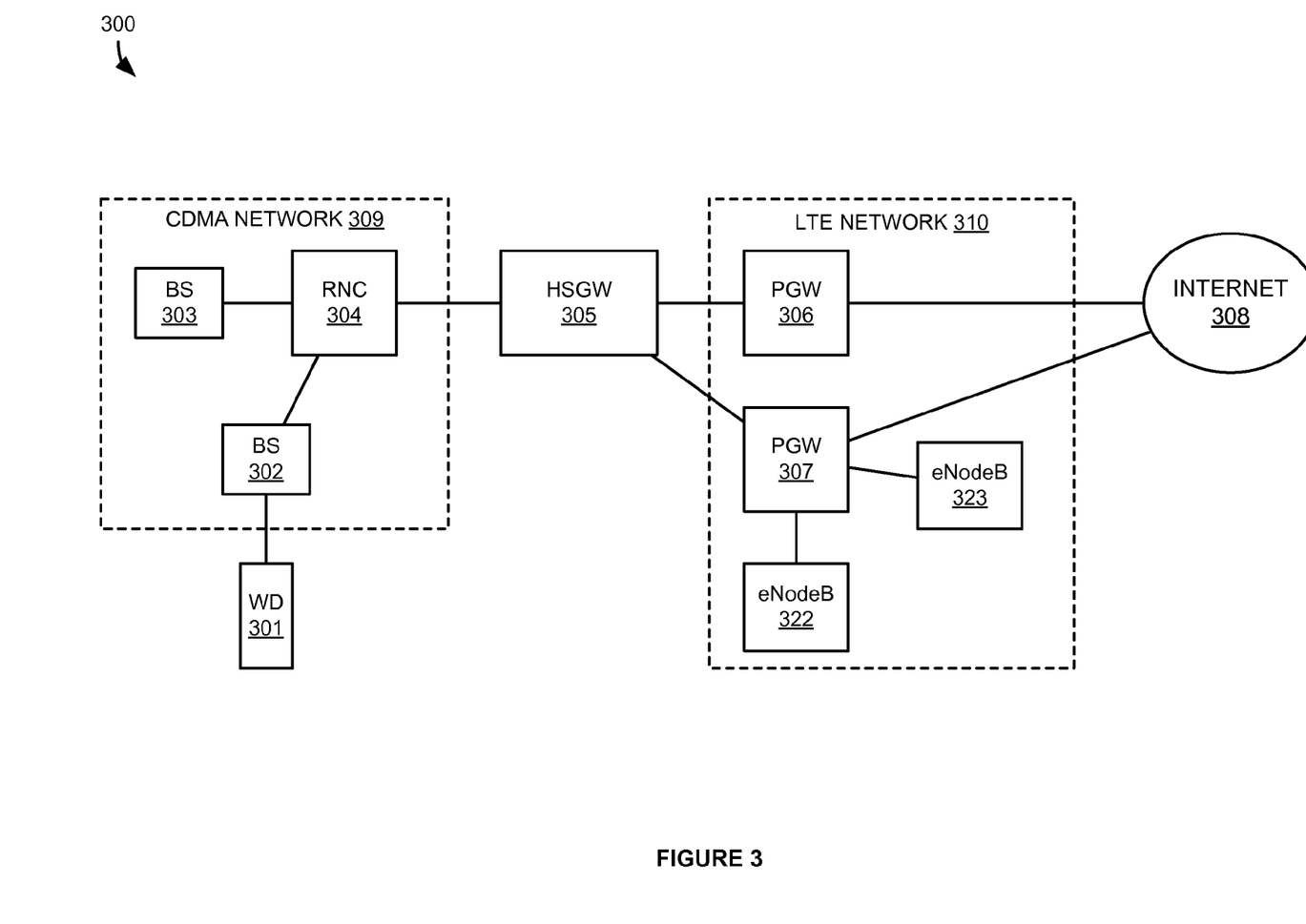
FIG. 3 illustrates a wireless communication system for dynamically selecting a packet gateway based on LTE network loading.

FIG. 3 illustrates wireless communication system 300. Wireless communication system 301 includes wireless communication device 101, non-LTE wireless communication network 102, LTE wireless communication network 103, packet gateway 104, packet gateway 105, network gateway 106, and communication control system 107.

In operation, wireless device 301 is able to communicate with base stations 302 and 303 of code division multiple access (CDMA) wireless network 309 using a CDMA wireless protocol. Wireless device 301 is also able to communicate with eNodeBs 322 and 323 of LTE wireless network 310 using an LTE wireless protocol. To provide data session continuity for wireless device 301 between networks 309 and 310, data sessions routed to Internet 308 are routed through a packet gateway (PGW) of LTE network 310. When a CDMA network is configured to route data sessions through an LTE network, the configuration is commonly referred to as Enhanced High Rate Packet Data (eHRPD).

If a data session is initiated when wireless device 301 is wirelessly communicating with eNodeB 322 or 323, then the data session will likely be established to Internet 308 through a PGW located nearest to servicing eNodeB. The nearest PGW may be the nearest PGW geographically to the servicing eNodeB or may be nearest in terms of network travel distance, although a nearest PGW will likely satisfy both criteria.

However, if a data session is initiated when wireless device 301 is wirelessly communicating with base station 302 or 303, then the data session may either be established through the PGW nearest, either geographically or network distance, to HSGW 305 through which the data session enters/exits LTE network 310 or through the PGW nearest to the location of wireless device 301. Selecting a PGW nearest to HSGW 305 provides better latency and requires less long haul bandwidth if wireless device 301 continues to exchange communications for the session with base station 302 or 303. In contrast, selecting a PGW nearest to wireless device 301 provides better latency and requires less long haul bandwidth if wireless device 301 switches to an eNodeB of LTE network 310.

Figure 4:
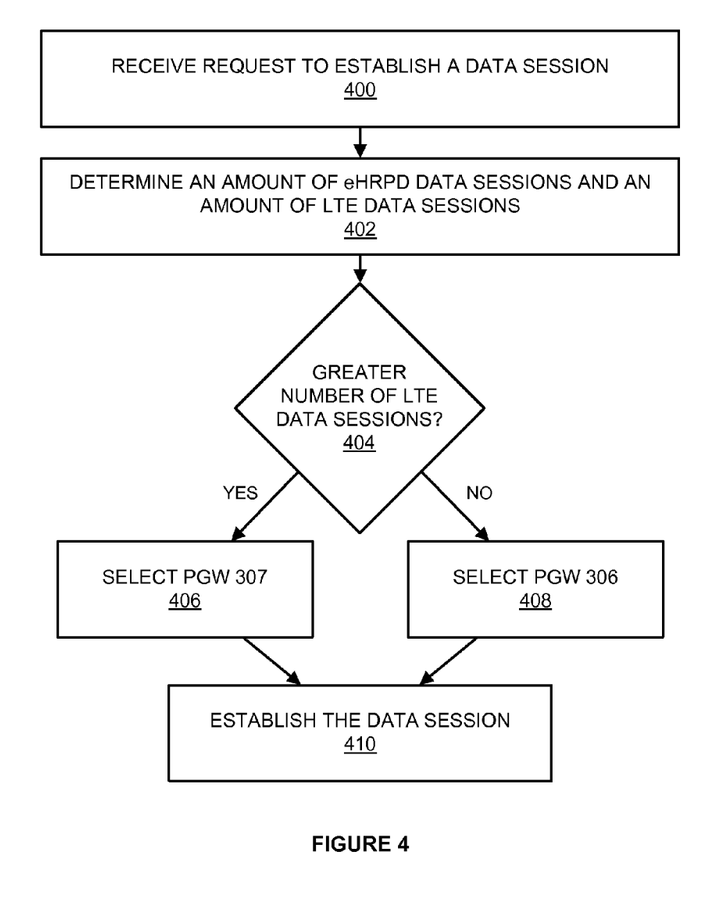
FIG. 4 illustrates an operation of the wireless communication system for dynamically selecting a packet gateway based on LTE network loading.

FIG. 4 illustrates an operation of wireless communication system 300 to dynamically select a packet gateway based on LTE network loading. HSGW 305 receives a request to establish a data session for wireless device 301 through CDMA network 309 (step 400). Specifically, wireless device 301 is accessing CDMA network 309 via base station 302 and RNC 304. The data session may be for an audio call, video call, audio/video media, web browsing, messaging, application information, or any other type of data communications that may be exchanged with a wireless communication device—including combinations thereof. The request may originate from wireless device 301 or from another system in wireless communication system 300, or elsewhere, intending to initiate a data session with wireless device 301.

HSGW 305 determines an amount of eHRPD active data sessions and an amount of LTE active data sessions currently being handled by CDMA network 309 and LTE network 310, respectively (step 402). In this embodiment, HSGW 305 receives information about the active eHRPD sessions from RNC 304 or otherwise recognizes eHRPD data sessions serviced through RNC 304. The amount of LTE active data sessions is determined for wireless devices within a geographic area similar to that covered by base stations of RNC 304. In particular, RNC 304 controls base stations 302 and 303 for this example. However, RNCs in other examples may control additional base stations.

Accordingly, HSGW 305 may determine the amount of LTE active data sessions for wireless devices located within the coverage area of base stations 302 and 303. Alternatively, the geographic area may be based on the area within a certain distance of RNC 304. Regardless of how the geographic area is determined, HSGW 305 determines the amount of LTE data sessions for wireless devices wirelessly communicating with LTE network 310 in the geographic area. HSGW 305 may determine that a device is within the geographic area based on the location of the device itself or based on the locations of eNodeBs servicing the geographic area (i.e. assume that a device is within the geographic area since the device is communicating with an eNodeB serving the geographic area).

In this example, eNodeBs 302 and 303 service wireless devices within the determined geographic area. Thus, HSGW 305 may receive information about the active LTE sessions from eNodeBs 302 and 303, a Mobility Management Entity (MME) for LTE network 310, or some other system that would be aware of the data sessions currently being serviced by eNodeBs 322 and 323.

Once HSGW 305 has determined the amount of each type of data session, HSGW 305 determines whether there are more LTE active data sessions or more eHRPD active data sessions (step 404). If there are more LTE active data sessions than eHRPD active data sessions, then HSGW 305 selects PGW 307, which is closer to eNodeBs 322 and 323 (step 406). However, if there are less LTE active data sessions than eHRPD active data sessions, then HSGW 305 selects PGW 306, which is closer to HSGW 305 (step 408).

After selecting a PGW for the data session, HSGW 305 establishes the data session with Internet 308 through the selected PGW (Step 410). Therefore, if wireless device 301 switches from communicating with base station 302 (or 303 if wireless device hands off to base station 303) to communicating with either or both of eNodeBs 322 and 323 during the data session, the data session remains established through the selected packet gateway. Moreover, in that situation, if HSGW 305 had determined that the amount of LTE active data sessions was greater than the amount of eHRPD active data sessions, then HSGW 305 selected PGW 307 in anticipation that wireless device 301 would begin communicating with eNodeB 322 or 323.

It should be understood that LTE network 310 may include additional eNodeBs and additional PGWs that may be nearer to those additional eNodeBs than is PGW 307. Therefore, if the amount of LTE active data sessions is determined to be greater in a geographic area serviced by one or more of the additional eNodeBs, then the selected PGW would be the PGW nearest to that one or more additional eNodeB.

Figure 5:
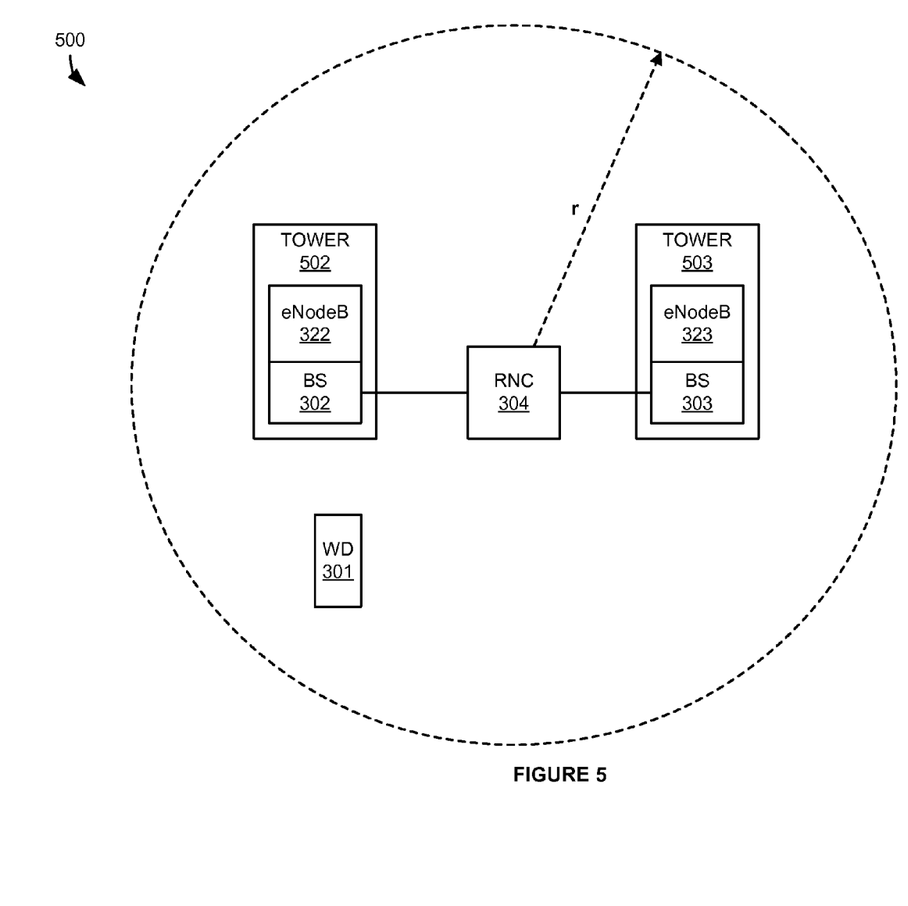
FIG. 5 illustrates a wireless communication system for dynamically selecting a packet gateway based on LTE network loading.

FIG. 5 illustrates wireless communication system 500 in a relative geographic location example of wireless communication system 300. Specifically, wireless communication system 500 includes wireless antenna towers 502 and 503. Base station 302 of CDMA network 309 and eNodeB 322 of LTE network 310 are both located near and use antennas positioned on tower 502. Likewise, base station 303 of CDMA network 309 and eNodeB 323 of LTE network 310 are both located near and use antennas positioned on tower 503.

In one example from above, the geographic area (determined at step 402 for use when identifying LTE active data sessions) is identified as bring all area within a distance from RNC 304. The distance 'r' represented in FIG. 5 may be any distance that represents the area serviced by RNC 304. For example, RNC 304 may be a base station controller (BSC) for base stations 302 and 303. If the coverage areas for base stations 302 and 303 are within a distance (e.g. 2 miles) of the BSC, then the distance 'r' is set to that distance. The amount of LTE active data sessions is then determined as the amount of LTE active data sessions within the area designated within distance 'r' from RNC 304.

Base stations 302 and 303 are both located within distance 'r' from RNC 304 and, since eNodeBs 322 and 323 are co-located on towers 502 and 503 with base stations 302 and 303, HSGW 305 determines the amount of LTE active data sessions on eNodeBs 322 and 323. Even though base stations 302 and 303 are co-located with eNodeBs 322 and 323 in this example, it should be understood that eNodeBs 322 and 323 may be located on other towers within the geographic area. Furthermore, the number of eNodeBs in the geographic area does not need to equate to the number of base stations.

Figure 6:
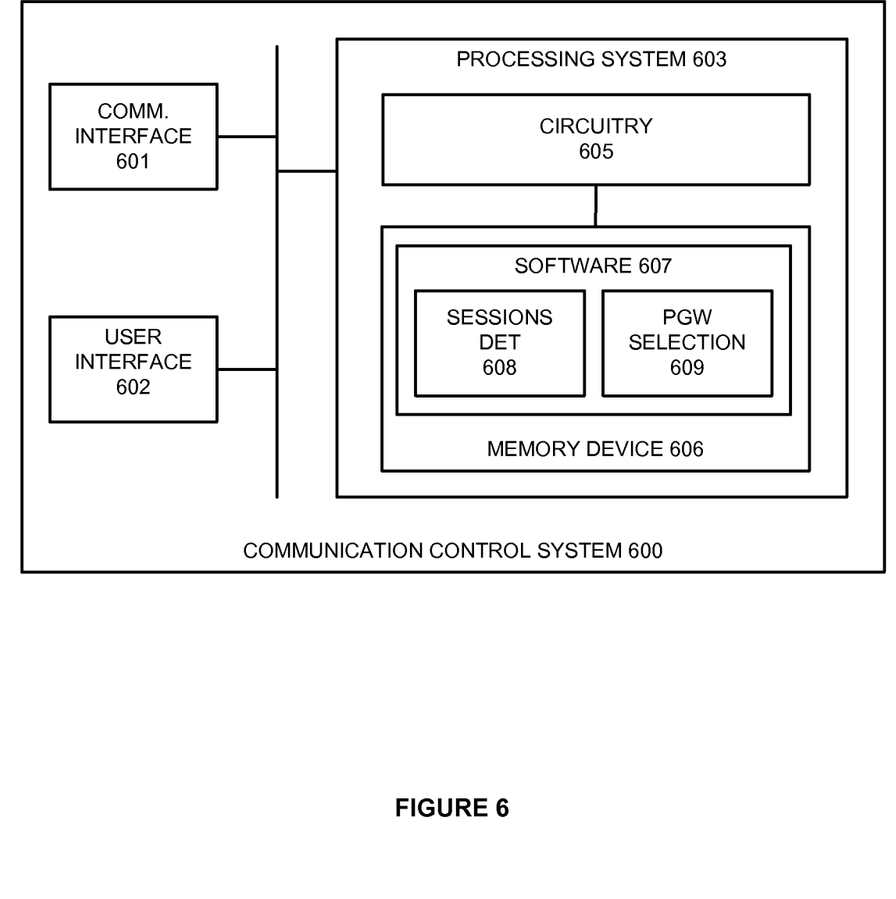
FIG. 6 illustrates a communication control system for dynamically selecting a packet gateway based on LTE network loading.

FIG. 6 illustrates communication control system 600. Communication control system 600 is an example of communication control system 107, although control system 107 may use alternative configurations. Communication control system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software 607 includes active sessions determination module 608 and packet gateway selection module 609. Operating software 607 may further include an operating system, utilities, drivers, network interfaces, applications, or some other type of software. When executed by circuitry 605, operating software 607 directs processing system 603 to operate communication control system 600 as described herein.

In particular, communication interface 601 receives a request to establish a data session for a wireless communication device through a non-LTE wireless network. Active sessions determination module 608 directs processing system 603 to determine an amount of non-LTE active data sessions on the non-LTE wireless network and determine an amount of LTE active data sessions on the LTE wireless network. Packet gateway selection module 609 directs processing system 603 to select a packet gateway for the data session based on the amount of non-LTE active data sessions and the amount of LTE active data sessions.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system in communication with a Long Term Evolution (LTE) wireless network and a non-LTE wireless network, the method comprising:
   receiving a request to establish a data session for a wireless communication device through the non-LTE wireless network;
   determining an amount of non-LTE active data sessions on the non-LTE wireless network;
   determining an amount of LTE active data sessions on the LTE wireless network;
   if the amount of non-LTE active data sessions is greater than the amount of LTE active data sessions, selecting a packet gateway closest to a gateway bridging the LTE wireless network and the non-LTE wireless network; and
   if the amount of non-LTE active data sessions is not greater than the amount of LTE active data sessions, selecting a packet gateway closest to a radio network controller serving the wireless communication device in the non-LTE wireless network.

2. The method of claim 1, wherein the amount of non-LTE active data sessions comprises an amount of active data sessions being serviced by the radio network controller serving the wireless communication device in the non-LTE wireless network.

3. The method of claim 2, wherein the amount of LTE active data sessions comprises an amount of active data sessions on the LTE wireless network for wireless communication devices in a geographic area around the radio network controller.

4. The method of claim 3, wherein the geographic area comprises an area within a predefined radius of the radio network controller.

5. The method of claim 3, wherein the geographic area comprises a wireless signal coverage area of access nodes associated with the radio network controller.

6. The method of claim 1, further comprising:
establishing the data session through the packet gateway.

7. The method of claim 1, wherein the packet gateway is located in the LTE wireless network.

8. The method of claim 1, wherein the non-LTE wireless network comprises a code division multiple access (CDMA) wireless network.

9. The method of claim 8, wherein a high rate packet data serving gateway (HSGW) bridges the CDMA wireless network and the LTE wireless network.

10. A communication system in communication with a Long Term Evolution (LTE) wireless network and a non-LTE wireless network, the wireless communication system comprising:
a communication interface configured to receive a request to establish a data session for a wireless communication device through the non-LTE wireless network; and
a processing system configured to determine an amount of non-LTE active data sessions on the non-LTE wireless network, determine an amount of LTE active data sessions on the LTE wireless network, and if the amount of non-LTE active data sessions is greater than the amount of LTE active data sessions, select a packet gateway closest to a gateway bridging the LTE wireless network and the non-LTE wireless network, and if the amount of non-LTE active data sessions is not greater than the amount of LTE active data sessions, select a packet gateway closest to a radio network controller serving the wireless communication device in the non-LTE wireless network.

11. The communication system of claim 10, wherein the amount of non-LTE active data sessions comprises an amount of active data sessions being serviced by the radio network controller serving the wireless communication device in the non-LTE wireless network.

12. The communication system of claim 11, wherein the amount of LTE active data sessions comprises an amount of active data sessions on the LTE wireless network for wireless communication devices in a geographic area around the radio network controller.

13. The communication system of claim 12, wherein the geographic area comprises an area within a predefined radius of the radio network controller.

14. The communication system of claim 12, wherein the geographic area comprises a wireless signal coverage area of access nodes associated with the radio network controller.

15. The communication system of claim 10, further comprising:
the processing system configured to establish the data session through the packet gateway.

16. The communication system of claim 10, wherein the packet gateway is located in the LTE wireless network.

17. The communication system of claim 10, wherein the non-LTE wireless network comprises a code division multiple access (CDMA) wireless network.

18. The communication system of claim 17, wherein a high rate packet data serving gateway (HSGW) bridges the CDMA wireless network and the LTE wireless network and the HSGW includes the communication interface and the processing system.

* * * * *